United States Patent
Wisotsky et al.

[15] 3,638,349
[45] Feb. 1, 1972

[54] OIL COMPOSITIONS CONTAINING COPOLYMERS OF ETHYLENE AND VINYL ESTERS OF $C_2$ TO $C_5$ MONOCARBOXYLIC ACID ETHYLENICALLY UNSATURATED

[72] Inventors: Max J. Wisotsky, Edison; Harold N. Miller, Millington, both of N.J.

[73] Assignee: Esso Research and Engineering Company

[22] Filed: Apr. 1, 1968

[21] Appl. No.: 717,914

[52] U.S. Cl. ................................................44/62, 44/70
[51] Int. Cl. ................................................C10l 1/14
[58] Field of Search ................................44/62, 70; 208/33

[56] References Cited

UNITED STATES PATENTS

| | | | |
|---|---|---|---|
| 3,048,479 | 8/1962 | Ilnyckyj et al. | 44/62 |
| 3,093,623 | 6/1963 | Ilnyckyj et al. | 44/62 |
| 3,236,612 | 2/1966 | Ilnyckyj et al. | 44/62 |
| 3,262,873 | 7/1966 | Tiedje et al. | 208/33 |

*Primary Examiner*—Daniel E. Wyman
*Assistant Examiner*—Mrs. Y. H. Smith
*Attorney*—Pearlman and Stahl and Frank T. Johmann

[57] ABSTRACT

Copolymers of 6,500 to 50,000 and preferably of 7,000 to 15,000 number average molecular weight, comprising 3 to 40 molar proportions of ethylene per molar proportion of vinyl ester of $C_2$ to $C_5$ monocarboxylic acid are flow improvers for distillate mineral oil, e.g. middle distillate fuel oil.

4 Claims, No Drawings

3,638,349

OIL COMPOSITIONS CONTAINING COPOLYMERS OF ETHYLENE AND VINYL ESTERS OF $C_2$ TO $C_5$ MONOCARBOXYLIC ACID ETHYLENICALLY UNSATURATED

BACKGROUND OF THE INVENTION

1. Field of the Invention

The present invention relates to oil compositions containing copolymers having molecular weights above 6,500 of ethylene and vinyl esters of $C_2$ to $C_5$ monocarboxylic acid, particularly vinyl acetate, and oil compositions containing said copolymers. These copolymers comprise about 3 to 40 molar proportions of ethylene monomer per about one molar proportion of vinyl ester.

2. Description of the Prior Art

The commercially most important ethylene-containing pour depressants for distillate oil are copolymers of ethylene and ethylenically unsaturated ester monomers, such as the copolymers of ethylene and vinyl alcohol esters, particularly vinyl acetate, which copolymers are well known in the prior art. For example, U.S. Pat. No. 3,048,479 teaches copolymers of ethylene and $C_3$ to $C_5$ vinyl esters, e.g., vinyl acetate, having molecular weights of about 1,000 to 3,000 according to K. Rast's method of determining mol. wt. (Ber. 55, 1,051, 3,727 (1922)), as pour depressants for fuels, specifically heating oils, diesel and jet fuels. U.S. Pat. No. 3,087,894 teaches a low cold test fogging oil containing as a pour depressant an ethylene-vinyl acetate copolymer essentially of the same type described in said U.S. Pat. No. 3,048,479. U.S. Pat. Nos. 3,093,623 and 3,131,168 teach a free radical process for making ethylene-vinyl ester copolymers of 1,000 to 3,000 molecular weight as pour depressants for petroleum middle distillate oils. U.S. Pat. No. 3,250,714 teaches ethylene-vinyl acetate copolymers having molecular weights of 3,500 to 7,000 as V.I. improvers for lubricating oils. More recently, Belgium Pat. 673,566 teaches ethylene-vinyl acetate copolymers up to 6,000 molecular weight as pour depressants for middle distillate oil.

These prior art ethylene-vinyl ester pour point depressants, while very effective in treating distillate fuel oil to lower the pour point, occasionally result in wax crystals having large particle sizes depending upon the exact nature of the distillate fuel oil being treated, e.g., crude source, narrowness of the boiling range, rate of cooling, etc. While the treated distillate oil containing these large wax crystals exhibits a pour point significantly under the original pour point of the untreated oil, in many cases, the large wax crystals will tend to plug filter equipment and lines normally used on delivery trucks and fuel oil storage systems when the oil is cooled below its cloud point, even though above its pour point. Thus as the oil containing the pour point depressant is cooled, the cloud point (the point at which the oil becomes cloudy due to crystallization of wax) will generally be reached at a temperature significantly above the pour point (the point at which the oil can no longer conveniently be poured). As a result, oils below their cloud point and above their pour point will be pourable, but at the same time the wax crystals that have formed, if too large, can result in plugging the aforesaid filter equipment. While the aforesaid prior art taught copolymers of ethylene and vinyl esters having a number average molecular weight up to 6,000 as pour depressants, the present invention is based on the finding that higher number average molecular weights above 6,000 improve flowability of the cold oil by forming smaller wax crystals during cooling of the treated oil, and are thus valuable wax crystal modifying agents. While not known with certainty, this improvement in crystal size by the higher molecular weight copolymers may be because the larger copolymer molecules disrupt the growing wax crystal more than the smaller copolymer molecules and thereby result in smaller wax crystals.

SUMMARY OF THE INVENTION

The copolymers used in the invention will contain at least 80 weight percent of a mixture of about 3 to 40, preferably 3 to 20, and most preferably 5 to 15, molar proportions of ethylene and a molar proportion of vinyl ester of $C_2$ to $C_5$ monocarboxylic acid. Up to 20 weight percent of the copolymer can be other polymerizable unsaturated monomers such as: $C_3$ to $C_{16}$ alpha monoolefins; $C_3$ to $C_{16}$ alkyl esters of an acrylic acid; mono or dialkyl esters of $C_4$ unsaturated dicarboxylic acid such as fumaric or maleic acid wherein said alkyl groups each contain three to 16 carbon atoms; etc. In any event, the copolymers used in the invention are oil-soluble and have number average molecular weights above the aforesaid prior art average of 6,500 to 50,000, preferably 7,000 to 15,000.

Specific examples of the vinyl esters include vinyl acetate, vinyl propionate, vinyl isobutyrate, etc. Specific examples of the $C_3$ to $C_{16}$ alpha monoolefins include: propylene, n-octene-1, n-decene-1, etc. Examples of the acrylic acid esters include methyl acrylate, methyl methacylate, lauryl acrylate, $C_{13}$ Oxo alcohol esters of methacrylic acid, etc. Examples of dicarboxylic acid esters include mono $C_{13}$ Oxo fumarate, di-$C_{13}$ Oxo fumarate, di-isopropyl maleate, dilauryl fumarate, ethyl methyl fumarate, etc.

The higher number average molecular weigh ethylene-vinyl ester copolymers of the invention can be prepared either by precipitation of high molecular weight components from a copolymer product having a lower number average molecular weight, or by directly copolymerizing the ethylene and vinyl ester to the higher number average molecular weight.

In general, the actual polymerization of the ethylene and vinyl ester can be carried out as follows. Solvent and a portion of the vinyl ester, e.g., 0–50, preferably 10 to 30 weight percent, of the total amount of unsaturated ester used in the batch, are charged to a stainless steel pressure vessel which is equipped with a stirrer. The temperature of the pressure vessel is then brought to the desired reaction temperature and pressured to the desired pressure with ethylene. Then catalyst, preferably dissolved in solvent so that it can be pumped, and additional amounts of unsaturated ester are added to the vessel continuously, or at least periodically, during the reaction time, which continuous addition gives a more homogeneous copolymer as compared to adding all the unsaturated ester at the beginning of the reaction. Also during this reaction time, as ethylene is consumed in the polymerization reaction, additional ethylene is supplied through a pressure-controlling regulator so as to maintain the desired reaction pressure fairly constant at all times. Following the completion of the reaction, the liquid phase of the pressure vessel is distilled to remove the solvent and other volatile constituents of the reacted mixture, leaving the polymer as residue. If a second ester or olefin is to be included in the copolymer, for example a small amount of di(dodecyl) fumarate, it can be added to the polymerization reactor along with the aforesaid vinyl ester.

Usually, based upon 100 parts by weight of copolymer to be produced, then about 100 to 600 parts by weight of solvent, and about 1 to 20 parts by weight of a free radical initiator will be used to catalyze the reaction.

The solvent can be any nonreactive organic solvent for furnishing a liquid-phase reaction which will not poison the catalyst or otherwise interfere with the reaction, and preferably is a hydrocarbon solvent such as benzene and hexane, The temperature used during the reaction will generally be in the range of 70° to 200° C.

Free radical initiators that can be used include acyl peroxides of $C_2$ to $C_{18}$, branched or unbranched, carboxylic acids such as: di-acetyl peroxide, di-propionyl peroxide, di-pelargonyl peroxide, di-lauroyl peroxide, etc. The lower acyl peroxides such as di-acetyl and di-propionyl peroxide are less preferred because they are shock-sensitive. Other free radical initiators that can be used include di-tert, butyl peroxide, benzoyl peroxide, various azo initiators such as azodiisobutyronitrile and azo bis 2-methylvaleronitrile, etc.

The pressures employed can range between 500 and 30,000 p.s.i.g. The molecular weight of the resulting copolymer depends to a large extent upon the pressure used. Thus, in general, pressure of above about 2,500 p.s.i.g. will give a copolymer produce having a number average molecular weight above 6,500. On the other hand, about 1,000 p.s.i.g. will give about 2,000 number average molecular weight. In the case of the lower molecular weight copolymers, they can be extracted to give the desired higher molecular weight fraction.

The time of reaction will depend upon, and is interrelated to, the temperature of the reaction, the choice of catalyst, and the pressure employed. In general, however, ½ to 10, usually 2 to 5 hours will complete the desired reaction.

The copolymers of the invention will generally be added to distillate hydrocarbon oils in amounts of 0.001 to 2 weight percent, generally 0.005 weight percent to about 0.5 weight percent, said weight percent being based upon the weight of the oil to be treated.

The distillate hydrocarbon oils, which are treated with the copolymers of this invention, include cracked and virgin distillate oils boiling in the range of 250° to 750° F., such as heating oil and diesel fuel oil.

The copolymers of the invention may be used alone as the sole oil additive, or in combination with other oil additives such as pour depressants, corrosion inhibitors, antioxidants, sludge inhibitors, etc.

The invention will be further understood by reference to the following examples which include preferred embodiments of the invention.

EXAMPLE

A copolymer of ethylene and vinyl acetate consisting of about 37 weight percent vinyl acetate (as measured by infrared analysis), and about 63 weight percent ethylene, and having a number average molecular weight of about 2,000 by vapor phase osmometry (V.P.O.), was precipitated into various number average molecular weight fractions. A typical preparation of this copolymer is as follows.

A 3-liter stirred autoclave is charged with 1,150 ml. of benzene as solvent and 40 ml. of vinyl acetate. The autoclave is then purged with nitrogen and then with ethylene. The autoclave is then heated to about 150° C. while ethylene is pressured into the autoclave until the pressure is raised to 950 p.s.i.g. Then, while maintaining a temperature of about 150° C. and said 950 p.s.i.g. pressure, 90 ml./hour of vinyl acetate and 30 ml./hour of a solution consisting of 23 weight percent t-butyl peroxide dissolved in 77 weight percent of benzene, is continuously pumped into the autoclave at an even rate. Vinyl acetate is injected over about 135 minutes, while the peroxide solution is injected into the reactor over a period of about 150 minutes from the start of the injection. After the last of said peroxide is injected, the batch is maintained at 150° C. for an additional 15 minutes. Then, the temperature of the reactor contents is lowered to about 60° C., the reactor is depressurized, and the contents are discharged from the autoclave. The empty reactor is rinsed with 1 liter of warm benzene (about 50° C.) which is added to the product. The product is then stripped of the solvent and unreacted monomers on a stem bath overnight by blowing nitrogen through the product.

A sample of 8.4 grams of the ethylene-vinyl acetate copolymer of 2,000 number average molecular weight was dissolved in 400 ml. xylene (about a 2.5 weight percent solution) and maintained in a flask at 48° C. 300 ml. of methanol (absolute) was added to the flask with vigorous stirring, and result in a visible turbidity. The temperature was raised to 58° C. to form a homogeneous solution which was then cooled to 30° C. with stirring. The solution was then centrifuged to form a precipitated-copolymer-rich phase as indicated by turbidity, and a precipitated-copolymer-poor phase, which phases were separated. The solvent was evaporated from the phase rich in precipitated polymer to give about 0.32 gm. of a copolymer having a number average molecular weight (V.P.O.) of about 9,300. The phase poor in precipitated copolymer was placed back in the flask at 39° C., more methanol was added to obtain about 0.09 gm. of a precipitated fraction having a number average molecular weight of about 5,500. In similar fashion, except that water was added with the methanol to further decrease solubility, the sample as further precipitated to give a 3,200 and a 1,750 mol. wt. fraction.

Several of the fractions obtained by the preceding technique were tested for flow-improving ability in two different petroleum middle distillate heating oils each consisting of a mixture of approximately 20 weight percent straight-run distillate and 80 weight percent cracked gas oil. These oils are hereinafter called Oil A and Oil B and their physical properties are set out below in Table I:

TABLE I

|  | Oil A | Oil B |
|---|---|---|
| Cloud point | 24° F. | 14° F. |
| ASTM pour point | 20° F. | 0° F. |
| Density at 25° C. | 0.8622 g./ml. | 0.8608 g./ml. |
| Visc. at 100° F. | 3.40 cs. | 3.01 cs. |
| Aniline point | 135° F. | 130° F. |
| Distillation |  |  |
| Initial boiling point | 364° F. | 346° F. |
| End point | 644° F. | 652° F. |

The oil compositions containing the polymer fractions were tested in a Fluidity Test, which involves placing a 40-milliliter sample of the oil to be tested into an hourglass-shape device, having upper and lower sections connected by an opening between the two sections having a diameter of about 2.25 mm. The lower section is covered by a thin aluminum disc. The oil in the tester is placed in a cold box and is cooled from a point 10° F. above the cloud point to 10° F. below the cloud point at the rate of 4° F./hr. The tester is inverted and allowed to settle for 1 minute. Then the aluminum disc is punctured so that the oil flows from the upper chamber through the aforesaid opening into the lower chamber. A pass is considered when 80 percent or more volume of the oil flows from the upper chamber to the lower chamber in a time of 3 minutes or less.

Table II which follows summarizes the pertinent properties of several of the polymer fractions extracted from the 2,000 average mol. wt. sample, together with their Flow Test data in Oils A and B.

TABLE II

[Characteristics of copolymers of ethylene-vinyl acetate of different mol. weight]

| Copolymer | No. avg. mol. wt. (VPO) | Wt. percent vinyl acetate by I.R. | Branching (n.m.r.) Ac/CH$_2$ | Branching (n.m.r.) CH$_3$/CH$_2$ | Fluidity test Oil A | Fluidity test Oil B |
|---|---|---|---|---|---|---|
| Original | 2,000 | 37 | .10 | .12 | .1%—Pass | .01%—Pass. |
| Precipitated | 9,300 | 36 | .09 | .13 | .1%—Pass | .01%—Pass. |
| Do | 3,200 |  |  |  | .1%—Fail | .01%—Pass. |
| Do | 1,750 |  | .12 | .11 | .1%—Fail | .01%—Fail. |
| None |  |  |  |  | Fail | Fail. |

As seen by Table II, the original copolymer sample had a number average molecular weight of about 2,000 (as determined by Vapor Phase Osmometry) and contained about 37 weight percent vinyl acetate as determined by infrared analysis. Nuclear magnetic resonance studies showed that this copolymer contained about 0.1 vinyl acetate group per methylene group as indicated by the ratio $Ac/CH_2$ of 0.10, and about 0.12 methyl terminating groups per methylene group as indicated by the ratio $CH_3/CH_2$. These methyl terminating groups do not include the methyl groups adjacent to the carbonyl group of the acetate but rather represent ethylene branching. Oil A containing 0.1 weight percent of the original polymer passed the Fluidity Test. Oil A is considered to be relatively nonresponsive to pour depressants of this type. Oil B, which is considered a responsive oil, containing 0.01 weight percent of the original polymer, also passed the Fluidity Test.

Table II further shows that the 9,300 number average molecular weight fraction had about the same vinyl acetate content, and about the same degree of branching, as the original copolymer sample. Also, the 9,300 mol. wt. fraction enabled Oils A and B to pass the Fluidity Test. However, the 3,200 number average molecular weight fraction, which is substantially devoid of high molecular weight molecules, when added to Oil B, failed the Fluidity Test. In addition, the 1,750 number average molecular weight fraction, when used with Oils A and B, failed the Fluidity Test.

As shown by Table II, ethylene-vinyl acetate copolymers having higher molecular weights, e.g., 9,300, are useful as wax crystal modifiers for heating oil as illustrated by the Fluidity Test results. This finding was unexpected in view of the teachings of the prior art, which taught that the use of low molecular weight ethylene-vinyl acetate copolymers was critical in order to obtain pour depression. As previously mentioned, the basis for this difference was that the prior art had considered these copolymers in terms of pour point depression only, whereas more recently it has been appreciated that the actual wax crystal size is in many cases more important than the pour point per se. And when considered from the viewpoint of flowability, these higher molecular weight copolymers are indeed useful as wax crystal modifying agents in distillate heating oils.

While the preceding example obtained the higher number average molecular weight ethylene-vinyl acetate copolymer by precipitation, it can also be prepared directly. For example, the copolymerization technique of Example I can be repeated, but at a higher pressure, say 4,000 p.s.i.g., to thereby produce a copolymer having a number average molecular weight above about 7,000.

One advantage of these higher molecular weight polymers is that they provide a new tool whereby they can be blended back with lower molecular weight fractions so as to balance the improvement in fluidity obtained by the higher molecular weight fraction with improvement in pour point obtained by the lower molecular weight fraction so as to tailor a pour depressant which will give optimum results in a particular base oil.

What is claimed is:

1. A composition consisting essentially of a petroleum distillate fuel oil boiling in the range of 250° to 750° F. and about 0.001 to 2 weight percent of a flow-improving copolymer consisting essentially of about 3 to 40 molar proportions of ethylene per molar proportion of vinyl alcohol ester of $C_2$ to $C_5$ monocarboxylic acid, said copolymer having a number average molecular weight of 6,500 to 50,000.

2. A composition as claimed in claim 1, wherein said copolymer contains about 5 to 15 molar proportions of ethylene, said vinyl ester is vinyl acetate, and said number average molecular weight is about 7,000 to 15,000.

3. A composition consisting essentially of a petroleum distillate fuel oil boiling in the range of 250° to 750° F. and as a flow improver about 0.005 to 0.5 weight percent of a flow-improving copolymer consisting essentially of ethylene and vinyl acetate in a relative molar ratio of about 5 to 15 molar proportions of ethylene per molar proportion of vinyl acetate, said copolymer consisting essentially of molecules having a molecular weight in the range of 6,500 to 50,000 and substantially free of molecules having a molecular weight below about 6,500.

4. A composition as claimed in claim 3, wherein said copolymer consists essentially of molecules having a molecular weight in the range of 7,000 to 15,000.

* * * * *